United States Patent [19]

Ishii

[11] Patent Number: 4,775,433

[45] Date of Patent: Oct. 4, 1988

[54] METHOD AND APPARATUS FOR MANUFACTURING RING-SHAPED BODIES

[75] Inventor: Ryutaro Ishii, Tokyo, Japan

[73] Assignee: Bridgestone Corporation, Tokyo, Japan

[21] Appl. No.: 898,169

[22] Filed: Aug. 18, 1986

[30] Foreign Application Priority Data

Aug. 28, 1985 [JP] Japan .................................. 60-189005

[51] Int. Cl.$^4$ ............................................ B29D 30/00
[52] U.S. Cl. .................................... 156/117; 156/172; 156/397; 156/425
[58] Field of Search ............... 156/117, 172, 425, 397, 156/126, 177, 439, 440, 173, 130, 405.1; 152/526, 531, 533; 242/7.19, 7.21, 2

[56] References Cited

U.S. PATENT DOCUMENTS

| 3,716,442 | 2/1973 | Hineline | 156/397 |
| 4,240,863 | 12/1980 | Vinton | 156/130 |
| 4,295,916 | 10/1981 | Stevens | 156/117 |

Primary Examiner—Michael W. Ball
Assistant Examiner—David Herb
Attorney, Agent, or Firm—Sughrue, Mion, Zinn, Macpeak and Seas

[57] ABSTRACT

A system for manufacturing a ring-shaped body where linear material is fed to a curved constituent member for forming said ring-shaped body substantially along a normal line of the constituent member at a winding point where the linear material is wound around said constituent member. The linear material is helically wound with a predetermined tensile force around a periphery of said curved constituent member while rotating said constituent member.

16 Claims, 4 Drawing Sheets

METHOD AND APPARATUS FOR MANUFACTURING RING-SHAPED BODIES

BACKGROUND OF THE INVENTION

1. Field of the Invention

This invention relates to a system for manufacturing a ring-shaped body, for example a tire, by helically winding a linear material around the periphery of a curved constituent member for forming the ring-shaped body.

2. Description of the Prior Art

Prior to this invention, a belt or breaker layer was formed either by winding a rubber-coated cord around the periphery of a green case, which is the carcass transformed into a torroidial shape, or, as disclosed in the Japanese Patent Unexamined Publication No. 14484/79, by winding a rubber-coated cord made of steel wire around the periphery of a base tire transformed into a torrodial shape. The cord is unwound continuously from a bobbin and helically wound around the base tire while being traversed (that is, moved left and right on the horizontal plane) by an operator or an applicator.

According to those two methods, however, since the traversal of the cord is carried out in a position removed from the base tire, the cord is fed to the green case or to the base tire while running in a direction parallel to the equatorial plane of the green case or the base tire. Moreover, since a predetermined force is being exerted upon this cord, when the winding position approaches the shoulder part, the intersection angle between the tangent to the base tire at the winding point and the rotation axis of the base tire becomes greater and a considerable force component acts upon the cord in the direction of the rotation axis. Consequently, a problem arises in that the cord can easily slip over the green case or the base tire surface and the covering density becomes irregular.

SUMMARY OF THE INVENTION

It is, therefore, an object of the present invention to solve the foregoing problem in the prior art.

It is another object of the present invention to provide a method as well as an apparatus for manufacturing ring-shaped bodies, for example, tires, by helically winding a linear material around a periphery of a curved constituent member to form the ring-shaped body.

In order to attain the above-mentioned objects, according to an aspect of the present invention, a method of manufacturing a ring-shaped body comprises the steps of: feeding a linear material to a curved constituent member for forming the ring-shaped body substantially along a normal line of the constituent member at a point where the linear material is wound around the constituent member; and helically winding the linear material with a predetermined tensile force around a periphery of the curved constituent member while rotating the constituent member.

According to another aspect of the present invention, an apparatus for manufacturing a ring-shaped body comprises: feed means for continuously feeding a linear material while traversing the linear material to a rotating curved constituent member for forming the ring-shaped body and for winding the linear material around a periphery of the constituent member; and control means for extending the linear material at a portion thereof immediately before being wound substantially along a normal line of the constituent member at a point where the linear material is wound around the constituent member.

According to the present invention, the linear material is continuously fed, while being traversed to a winding point on the periphery of the curved constituent member, which is being rotated, so that the linear material is helically wound around the ring-shaped body constituent member. In that moment, even if a predetermined tensile force is exerted upon the linear material, there will be no component force acting upon the linear material in the direction of the axis of rotation of the ring-shaped body constituent member. Thus, the linear material does not transversely slip on the peripheral surface of the ring-shaped body constituent member and the covering density can be maintained uniform, because the linear material is extended at a portion immediately before being wound substantially along the normal line of the ring-shaped body constituent member at a point where the linear material is wound around the constituent member.

DESCRIPTION OF PREFERRED EMBODIMENT

Figure 1:
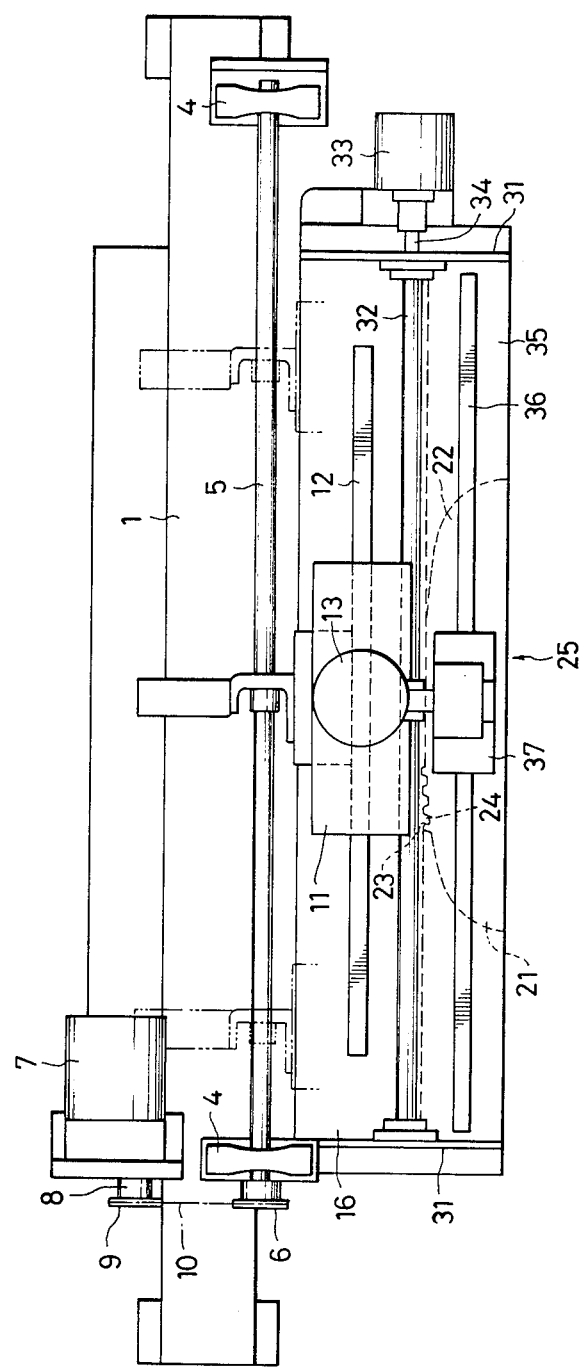
FIG. 1 is a plan view showing an embodiment of the present invention.
Figure 2:
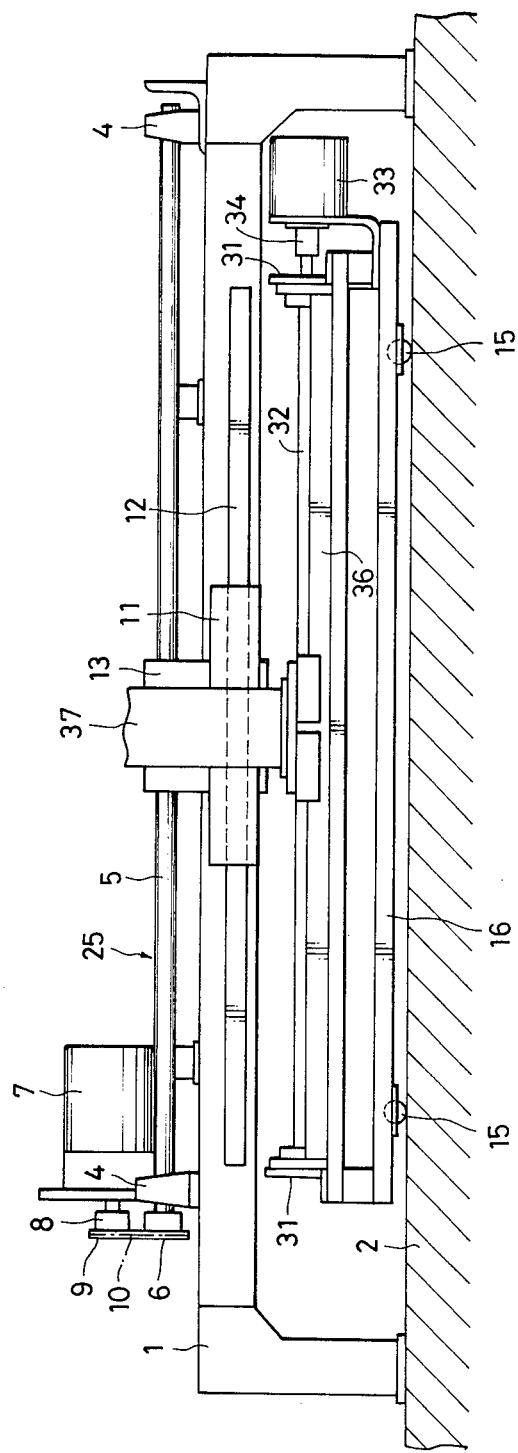
FIG. 2 is a front view of the invention.
Figure 3:
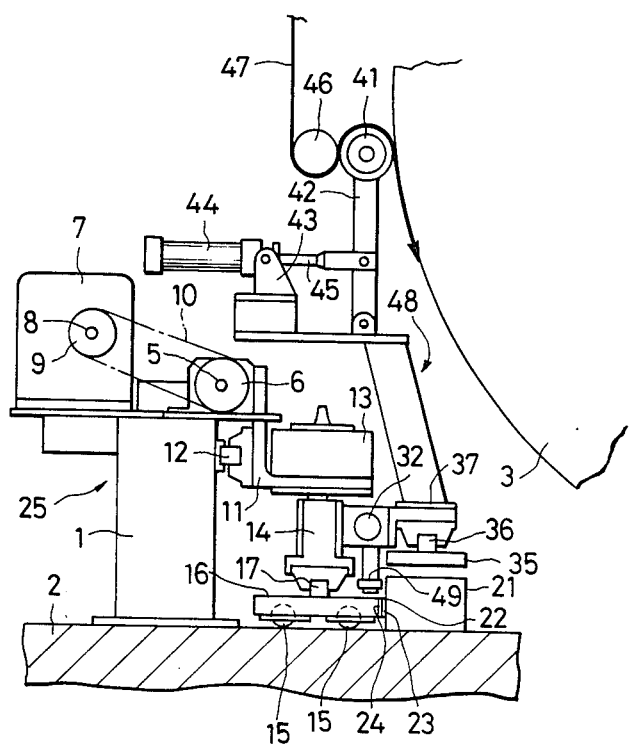
FIG. 3 is a side view of the invention.

Referring to the drawings, an embodiment of the present invention will now be described.

in FIGS. 1, 2 and 3, a frame 1 is disposed on a base surface 2 to extend in the direction parallel to an axis of rotation of a tire constituent member such as a carcass or the like which is rotated by a drum (not shown). The tire constituent member 3 has been transformed into a torroidal shape, to be as a whole curved. A lead screw 5 extending in parallel to the frame 1 is rotatably supported at its opposite ends by a pair of bearings 4 which are fixed to the frame 1. A sprocket 6 fixed to the lead screw 5 and another sprocket 9 fixed to an output shaft 8 of an electric motor 7 are linked with each other by a chain 10 engaged with the respective sprokets 6 and 9. The lead screw 5 is mounted through a part of a movable base 11 so that as the lead screw 5 rotates, the movable base 11 is displaced while being guided by a horizontal rail 12 which is fixed to the frontal side surface of the frame 1.

A torque actuator 13 is installed on the movable base 11 and a rotary block 14 is fixed to an output shaft of the torque actuator 13. When the movable base 11 is displaced left in the drawing from an axialy central portion of the lead screw 5, the rotary block 14 is rotated in the counterclockwise direction, and vice versa. A tilting plate 16 is provided directly below the rotary block 14, and a plurality of ball casters 15 are installed on the bottom surface of the tilting plate 16 to roll over the base surface 2. A straight rail 17 is fixed on the upper surface of the tilting plate 16, and slidably fitted to the lower end of the rotary block 14. A contour block 21 is provided directly below the tire constituent member 3 and in front of the tilting plate 16.

A back surface 22 of the contour block 21 facing the tilting plate 16 has a profile identical to the projection of a crown part of the tire constituent member 3 onto a plane directly thereunder. Teeth 23 and 24 are formed respectively on the back surface 22 and on the frontal surface of the tilting plate 16 to prevent mutual slipping between those surfaces in the direction of their length. Therefore, the back surface 22 and the front surface of the tilting plate 16 touch each other without slipping. Consequently, if, for example, the movable base 11 moves to the left, the tilting plate 16 rolls over the back surface 22 and tilts in the counterclockwise direction.

At any moment, the extending direction of the tilting plate 16 is parallel to a tangent to the back surface 22 at a contacting point. The lead screw 5, the motor 7, the movable base 11, the torque actuator 13, the rotary block 14, the tilting plate 16, the rail 17, the counter block 21, and a sensor 49, which will be described herein constitute the control portion 25. A lead screw 32 extending in parallel to the tilting plate 16 is rotatably supported by brackets 31 which are fixed on the tilting plate 16 at its opposite ends in the lengthwise direction thereof.

An output shaft 34 of an electric motor 33 is connected to the lead screw 32. A rail 36 is fixed to a plate 35 installed on the bracket 31. The lead screw 32 is screwed through a movable frame 37 so that the frame 37 is displaced while being guided by the rail 36. An arm 42 is rotatably connected at its lower end with an upper portion of the movable frame 37 and a feed roller 41 is rotatably supported on an upper end of the arm 42. As illustrated in FIG. 3, an extremity of a piston rod 45 protruding from a cylinder 44 pushes the feed roller 41 against the tire constituent member 3, is connected to a central portion of the arm 42. Reference numeral 46 designates a guide roller and 47 designated a rubber-coated steel wire cord, that is, the linear material, to be wound around the periphery (crown portion) of the tire constituent member 3. The lead screw 32, the motor 33, the rail 36, the movable frame 37, the feed roller 41, the arm 42, and the cylinder 44 constitute feeding portion 48 for feeding the cord 47 continuously, while traversing it, to the periphery of the tire constituent member 3. Reference numeral 49 designates a sensor fixed on the movable frame 37 for measuring the distance from the frame 37 to the back surface 22 of the contour block 21.

The operation of the preferred embodiment of the invention will be explained.

Figure 4A:
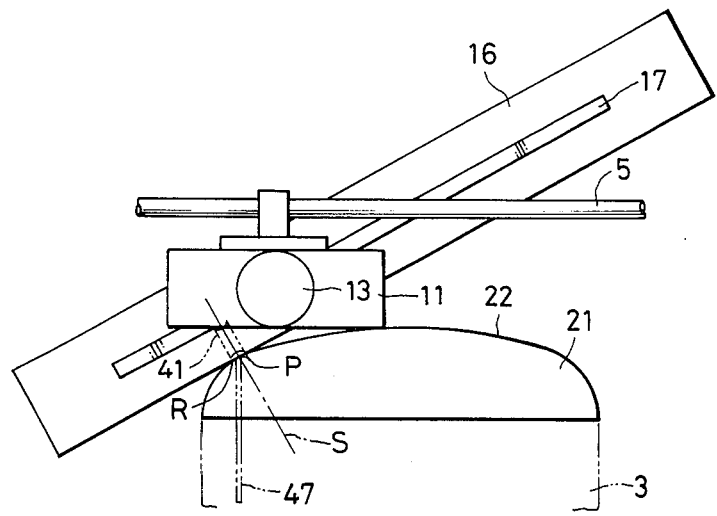
FIGS. 4A and 4B are diagrams for explaining the operation of the preferred embodiment illustrated in FIGS. 1–3.

As shown in FIG. 4A, the cord 47 is wound on the tire constituent member 3 at a point P. During this activity, the movable base 11 travels to the position shown in FIG. 4A, and the tilting plate 16 and the contour block 21 touch each other at a point R, directly under the point P, because the tilting plate 16 is inclined, as shown, due to the counterclockwise torque supplied by the torque actuator 13. In this manner, when the tilting plate 16 and the contour block 21 touch each other at point R, the tilting plate 16 forms a tangent to the contour block 21 at the contact point R. At this moment, since the axis of rotation of the feed roller 41 is parallel to the tilting plate 16. The cord 47, which is fed through the tilting plate 16, extends at a portion immediately before being wound in the direction of the normal line S at the point P of the tire constituent member 3. Moreover, despite the fact that the cord 47 is always stretched with a predetermined tensile force, no force component acts upon this cord in the direction of the axis of rotation of the tire constituent member 3. This is because, as described above, the direction of extension of the cord 47 coincides with the normal line S at the winding point P. Since the tire constituent member 3 rotates in those conditions, the cord 47 is wound around the periphery of the tire constituent member 3 without slipping sideways.

At this moment, pulses in correspondence to the rotation of the tire constituent member 3 are sent to a counter (not shown). When the number of pulses inputted into the counter reaches a predetermined value, a signal is sent to the motor 33, so that the motor 33 is rotated a predetermined number of times. The lead screw 32 is rotated proportionally to the rotation of the tire constituent member 3, so that the movable frame 37 moves together with the feed roller 41 along the rail 36, that is, along the inclined tilting plate 16. Thus, the cord 47, which is fed continuously to the tire constituent member 3, traverses and is helically wound around the periphery of the tire constituent member 3 with an equal pitch.

In this manner, when the cord 47 has been wound around the tire constituent member 3 a number of times. The extending direction of the cord 47, which is fed through the feed roller 41, deviates a little from the direction of the normal line S at the position of winding and the distance between the sensor 49 and the back surface 22 increases. This occurs because the movable frame 37 and the feed roller 41 move linearly along the rail 36 over a distance corresponding to the product of the number of winding revolutions and the winding pitch. When the distance between the sensor 49 and the back surface 22 is greater than a predetermined value, the motor 7 is actuated to rotate the output shaft 8 and the lead screw 5. The movable base 11 and the rotary block 14 move in the traversing direction. At this moment, however, since the torque actuator 13 always supplies a counterclockwise torque to the tilting plate 16, and the rail 17 and the rotary block 14 are fitted to each other, the tilting plate 16 rolls clockwise while tilting, without slipping, on the back surface 22 of the contour block 21. Consequently, the feed direction of the cord 47 and the back surface 22 coincides with the normal line S at the winding point P, and the distance between the sensor 49 and the back surface 22 decreases. When this distance becomes smaller than a predetermined value, the motor 7 is stopped. In this way, the cord 47 is helically wound with an equal pitch around the periphery of the tire constituent member 3.

Figure 4B:
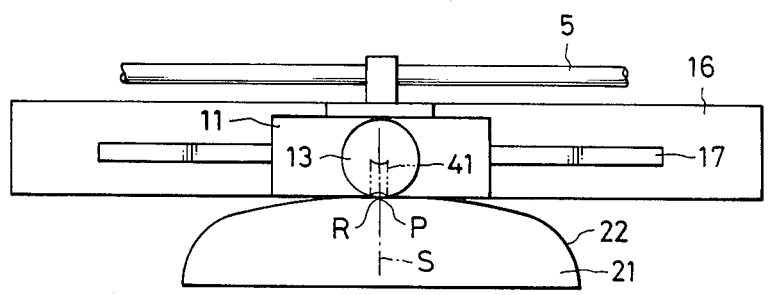

When the cord 47 has been wound at the equatorial portion of the tire constituent member 3, the tilting plate 16 becomes parallel to the axis of rotation of the tire constituent member 3, as shown in FIG. 4B. Then, when the winding position is changed to the right of the equatorial center, the torque actuator 13 supplies torque in the clockwise direction. Moreover, in the case of changes in the shape or diameter of the tire constituent member 3, the contour block 21 is substituted for one adequate to the new shape or diameter.

Moreover, according to the present invention, an NC (numerical control) device may be partly or wholly used as the control system 25. Further, according to the present invention, chains, toothed belts, or the like, may be provided, through bonding or the like, on the tilting plate 16 and on the contour block 21, to prevent mutual slipping therebetween. Further, the present invention can be utilized for the regeneration of used tires. Also, according to the present invention, a rubber material in a long and narrow band shape can be utilized as the linear material.

As described above, according to the present invention, the linear material does not slip sideways over the surface of the ring-shaped body constituent member, and the covering identity can be maintained uniform.

What is claimed is:

1. A method of manufacturing a ring-shaped body comprising the steps of:
   pushing feeding means against a curved constituent member in a direction of normal line thereof;
   feeding continuously a linear material to said curved constituent member for forming said ring-shaped body substantially perpendicular to the normal line of said constituent member at a winding point where said linear material is wound around said constituent member;
   helically winding said linear material with a predetermined tensile force around a periphery of said curved constituent member while rotating said constituent member, and
   sensing the distance between a sensor and a contour block having a profile identical to said curved constituent member and positioning feeding means in a direction perpendicular to a normal line of said curved constituent member for feeding said linear material in response to said sensed value.

2. The method of claim 1 wherein said constituent member is a tire casing.

3. The method of claim 1 wherein said linear material is a rubber coated steel cord.

4. The method of claim 1 further comprising the step of stretching said linear material with a predetermined tensile force during the step of feeding whereby forces on said linear member in a direction of the axis of rotation of said constituent member are minimized.

5. The method of claim 1 further comprising the step of sensing rotation of said constituent member and producing output signals, and moving said feeding means to maintain said winding point along said normal line in coordination with said output signals.

6. An apparatus for manufacturing a ring-shaped body comprising:
   feed means for continuously feeding a linear material to a rotating curved constituent member by feeding said linear material perpendicular to the normal line of the constituent member for forming said ring-shaped body and for winding said linear material around a periphery of said constituent member;
   means for urging said feed means against said rotating curved constituent member in a direction of normal line thereof; and
   control means for extending said linear material at a portion thereof immediately before being wound substantially along a normal line of said constituent member at a winding point where said linear material is wound around said constituent member,
   said control means comprises a contour block having a profile identical to said rotating curved constituent member, a tilting plate facing one surface of said contour block, which touches said contour block at one point and mounts said feed means, and sensor means for sensing a distance between said sensor and said contour block in which said tilting plate moves along said one surface of said contour block in response to an output signal from said sensor means thereby to position said feed means perpendicular to said normal line of said rotating curved constituent member.

7. The apparatus of claim 6 further comprising control means having a base member, a drive member mounted on said base, means to move said drive member, a movable member mounted on said drive member.

8. The apparatus of claim 7 further comprising a torque actuator mounted on said movable member, a rotary block attached to said torque actuator, and a tilting plate provided below said rotary block.

9. The apparatus of claim 8 further comprising a lead screw parallel to said tilting plate and means to rotate said lead screw.

10. The apparatus of claim 6 wherein said feed means comprises a feed roller mounted on an arm and means to move said arm.

11. The apparatus of claim 10 wherein said feed roller is rotatably mounted on said arm and said arm is rotatably connected to said means to move said arm.

12. The apparatus claim 11 further comprising means to urge said feed roller against said constituent member.

13. The apparatus of claim 10 wherein said means to move said arm comprises a lead screw mounted on a frame, a movable frame mounted on said lead screw, wherein said arm is rotatably connected to said movable frame.

14. The apparatus of claim 13 further comprises means to sense the horizontal distance between said movable frame and a sensor to maintain a predetermined tensile force on said linear material.

15. The method of claim 1 further comprising the step of moving said feeding means with an equal pitch in a traversing direction of the feeding direction of said linear material in response to a signal representing the number of the rotation of said curved constituent member during the step of feeding.

16. The apparatus of claim 6 wherein said control means moves said feed means with an equal pitch in a traversing direction of said rotating curved constituent member in response to the number of the rotation of said curved constituent member.

* * * * *